(12) United States Patent
Blueml et al.

(10) Patent No.: US 10,352,484 B2
(45) Date of Patent: Jul. 16, 2019

(54) EXHAUST SYSTEM

(75) Inventors: Alfred Blueml, Issing (DE); Hongjiang Cui, Meitingen (DE)

(73) Assignee: FAURECIA EMISSIONS CONTROL TECHNOLOGIES GERMANY GMBH (DE)

(*) Notice: Subject to any disclaimer, the term of this patent is extended or adjusted under 35 U.S.C. 154(b) by 864 days.

(21) Appl. No.: 13/011,982

(22) Filed: Jan. 24, 2011

(65) Prior Publication Data

US 2011/0114216 A1    May 19, 2011

Related U.S. Application Data

(63) Continuation-in-part of application No. 11/573,009, filed as application No. PCT/EP2005/007191 on Jul. 4, 2005, now abandoned.

(30) Foreign Application Priority Data

Aug. 5, 2004  (DE) .................... 10 2004 038 099

(51) Int. Cl.
 *F16L 13/08*    (2006.01)
 *B23K 1/002*    (2006.01)
 *B23K 101/06*   (2006.01)

(52) U.S. Cl.
 CPC .............. *F16L 13/08* (2013.01); *B23K 1/002* (2013.01); *B23K 2101/06* (2018.08)

(58) Field of Classification Search
 CPC ...... F16L 13/08; B23K 1/002; B23K 2201/06
 See application file for complete search history.

(56) References Cited

U.S. PATENT DOCUMENTS

| | | | |
|---|---|---|---|
| 654,131 A | 7/1900 | Burke |
| 1,801,171 A | 4/1931 | Mueller et al. |
| 1,986,010 A | 1/1935 | Elmer |
| 2,033,122 A | 3/1936 | Cornell |
| 2,083,528 A | 6/1937 | Burkart |
| 2,120,067 A | 6/1938 | Gray et al. |
| 2,174,218 A | 9/1939 | Greene |
| 2,297,554 A | 9/1942 | Hardy et al. |
| 2,645,006 A | 7/1953 | Hadley |
| 2,661,282 A | 12/1953 | Daley |
| 2,781,785 A | 2/1957 | Davies |

(Continued)

FOREIGN PATENT DOCUMENTS

| | | |
|---|---|---|
| DE | 810451 | 8/1951 |
| DE | 810451 B | 8/1951 |

(Continued)

OTHER PUBLICATIONS http://www.thirdgen.org/techboard/tech-general-engine/22716-can-you-solder-exhaust.html, "Can you solder an exhaust pipe?", Jul. 2000-Feb. 2001.*

(Continued)

*Primary Examiner* — James M Hewitt, II
(74) *Attorney, Agent, or Firm* — Carlson, Gaskey & Olds, P.C.

(57) ABSTRACT

An exhaust gas system includes a first exhaust component and a second exhaust component that are spaced apart from each other by a solder gap that can be has great as 1.20 mm. A high temperature solder material is provided near the solder gap and is heated by an inductor to form an induction solder joint between the first and second exhaust components.

29 Claims, 13 Drawing Sheets

(56) References Cited

U.S. PATENT DOCUMENTS

| | | | |
|---|---|---|---|
| 3,209,862 A * | 10/1965 | Young | 181/245 |
| 3,268,703 A | 8/1966 | Schoppman et al. | |
| 3,334,925 A | 8/1967 | Jayne | |
| 3,410,581 A | 11/1968 | Christensen | |
| 3,427,707 A | 2/1969 | Nowosadko | |
| 3,503,631 A | 3/1970 | Greever | |
| 3,528,688 A | 9/1970 | Stenerson | |
| 3,530,953 A | 9/1970 | Conlin | |
| 3,645,358 A * | 2/1972 | Kubota et al. | 181/211 |
| 3,667,109 A | 6/1972 | Alcenius | |
| 3,680,200 A | 8/1972 | Terrill et al. | |
| 3,750,248 A | 8/1973 | Morris | |
| 4,396,213 A | 8/1983 | Hawkins | |
| 4,847,967 A * | 7/1989 | Gaudin | 29/890.031 |
| 5,042,847 A | 8/1991 | Lasecki et al. | |
| 5,137,202 A | 8/1992 | Purdy | |
| 5,338,072 A * | 8/1994 | Bitter et al. | 285/288.1 |
| 5,358,168 A | 10/1994 | Williamson | |
| 5,579,834 A * | 12/1996 | Chiba | 165/173 |
| 5,593,645 A * | 1/1997 | Steenackers et al. | 422/176 |
| 6,164,517 A * | 12/2000 | Kim | 228/56.3 |
| 6,478,213 B1 * | 11/2002 | Higgins | B23K 1/0008 228/126 |
| 6,847,001 B2 | 1/2005 | Ananthanarayanan et al. | |
| 6,922,882 B2 * | 8/2005 | Shah | B21D 39/04 29/421.1 |
| 6,998,560 B2 | 2/2006 | Ananthanarayanan et al. | |
| 7,053,147 B2 | 5/2006 | Jackson et al. | |
| 7,204,114 B2 * | 4/2007 | Ni | B21D 26/033 72/370.06 |
| 2003/0196307 A1 * | 10/2003 | Chen | B21C 37/065 29/421.1 |
| 2005/0077343 A1 * | 4/2005 | Sato et al. | 228/256 |
| 2008/0105419 A1 * | 5/2008 | Oh et al. | 165/173 |
| 2009/0261574 A1 | 10/2009 | Blueml et al. | |

FOREIGN PATENT DOCUMENTS

| | | |
|---|---|---|
| DE | 19521583 A1 * | 12/1996 |
| DE | 29521672 U1 * | 2/1998 |
| DE | 295 21 672 U1 | 3/1998 |
| DE | 29521672 | 3/1998 |
| EP | 1061240 | 12/2000 |
| EP | 1061240 A | 12/2000 |
| EP | 1061240 A2 * | 12/2000 |
| EP | 1365121 | 11/2003 |
| GB | 280719 A | 11/1927 |
| GB | 308487 A | 3/1929 |
| GB | 344407 A | 3/1931 |
| GB | 667029 A | 2/1952 |
| GB | 881309 | 11/1961 |
| GB | 881309 A | 11/1961 |
| GB | 997525 A | 7/1965 |
| GB | 2092692 | 8/1982 |
| JP | 58081559 | 5/1983 |
| JP | 62082285 A * | 4/1987 |
| JP | 03071973 | 3/1991 |
| JP | 4172175 | 6/1992 |
| JP | 6159051 | 6/1994 |
| JP | 07068374 | 3/1995 |
| JP | 07068374 A | 3/1995 |
| JP | 09 004448 A | 1/1997 |
| JP | 09004448 A | 1/1997 |
| JP | 09 088581 A | 3/1997 |
| JP | 09088581 A | 3/1997 |
| JP | 11132039 | 5/1999 |
| JP | 2002138830 | 5/2002 |

OTHER PUBLICATIONS

Draft Bulletin DVS 938-2 "Electric arc Soldering" of the German Association of Welding Technology (Oct. 2002).
PCT International Search Report for PCT/EP2005/007191 complete by the EP Searching Authority on Sep. 16, 2005.
PCT International Search Report for PCT/EP2005/007191 completed by the EP Searching Authority on Sep. 16, 2005.
Draft Bulletin DVS 938-2 "Electric Arc Soldering" of the German Association of Welding Technology (Oct. 2002).

* cited by examiner

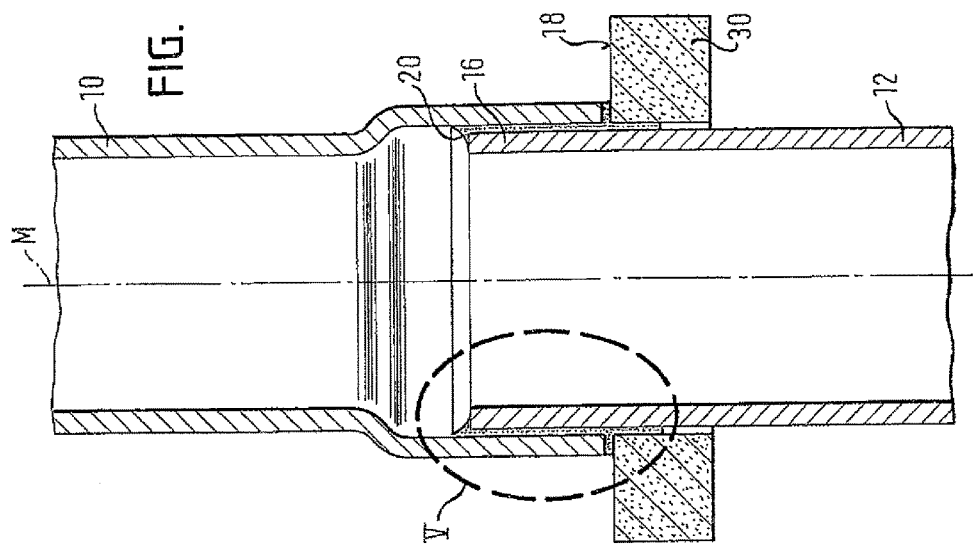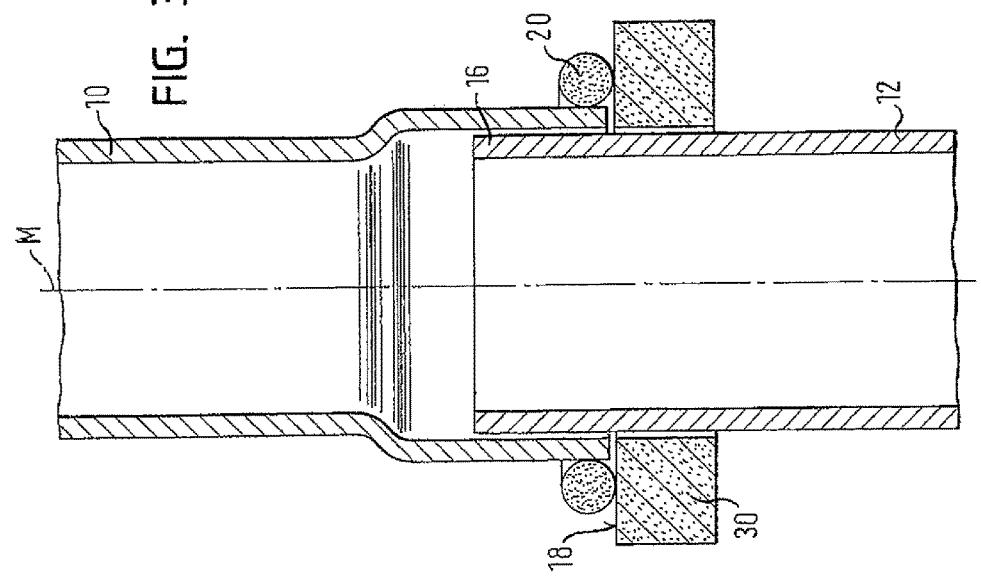

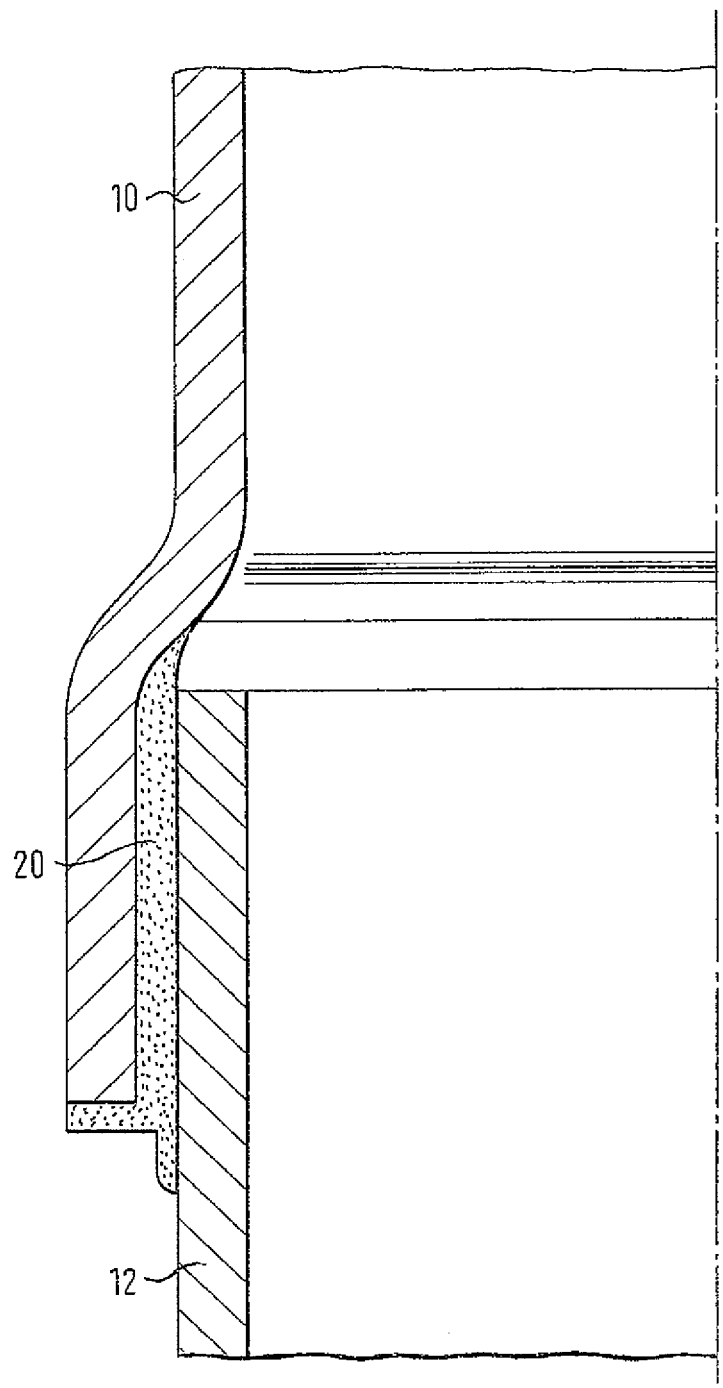

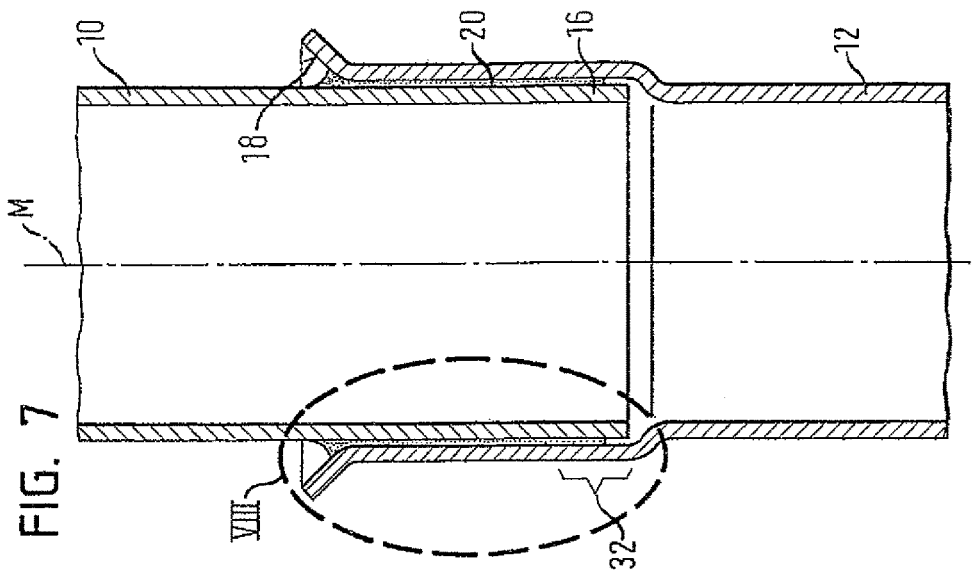
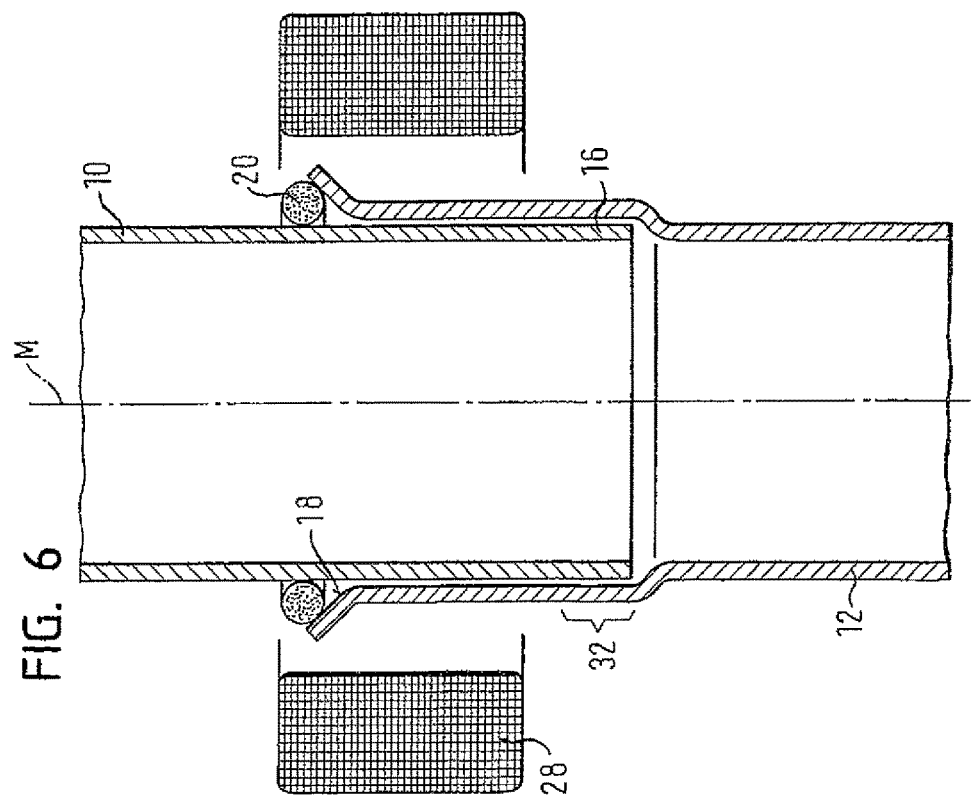

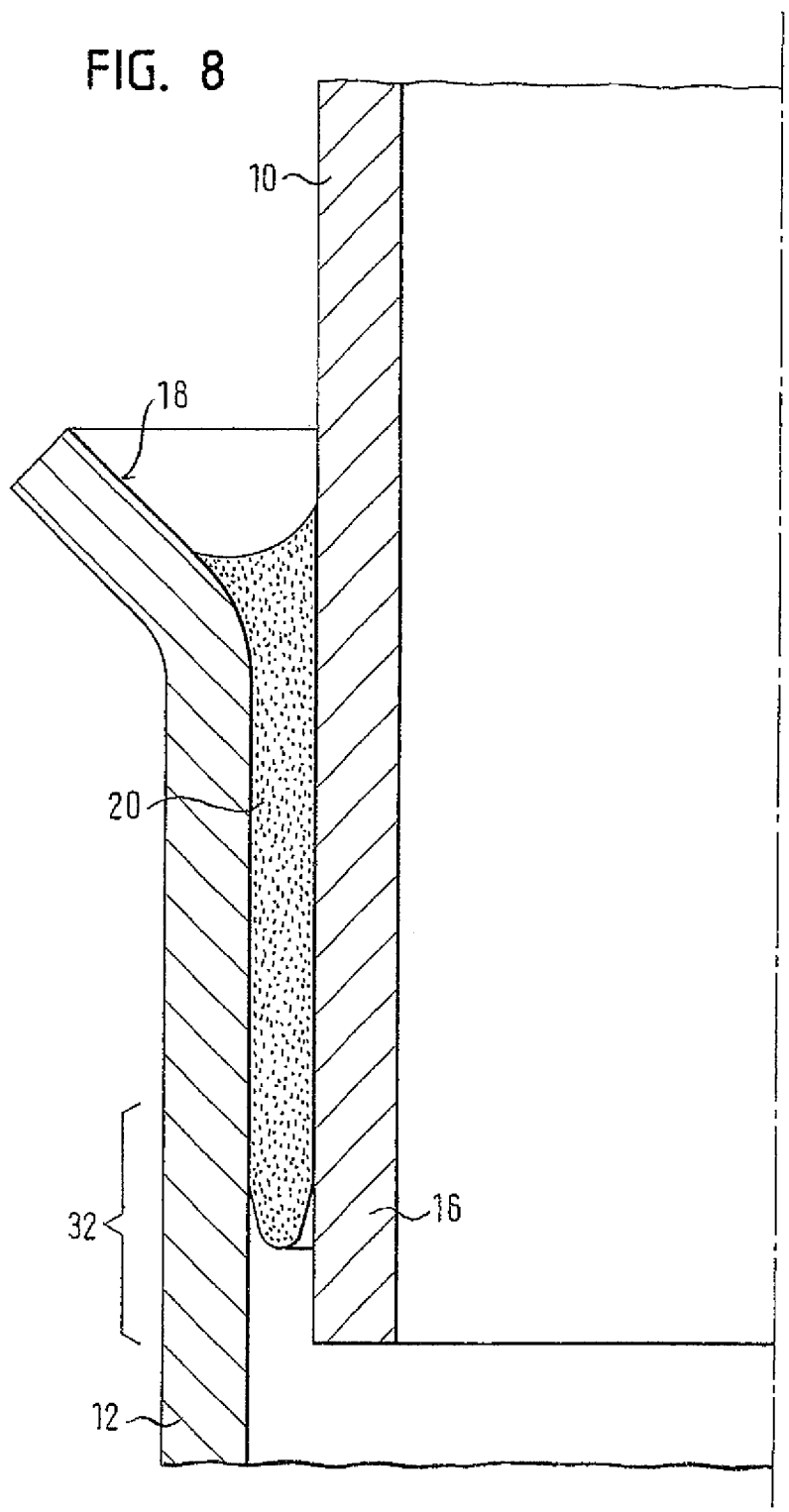

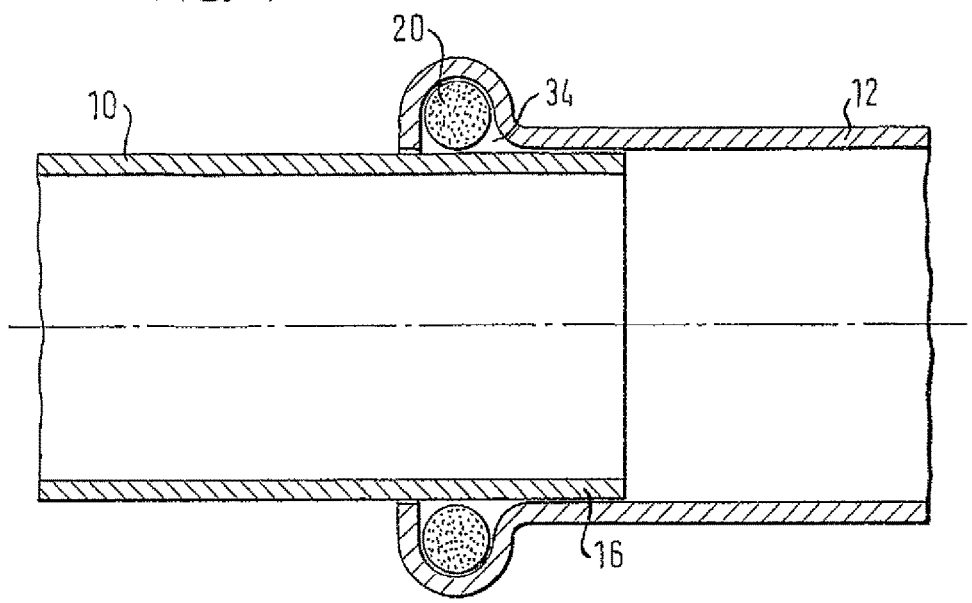
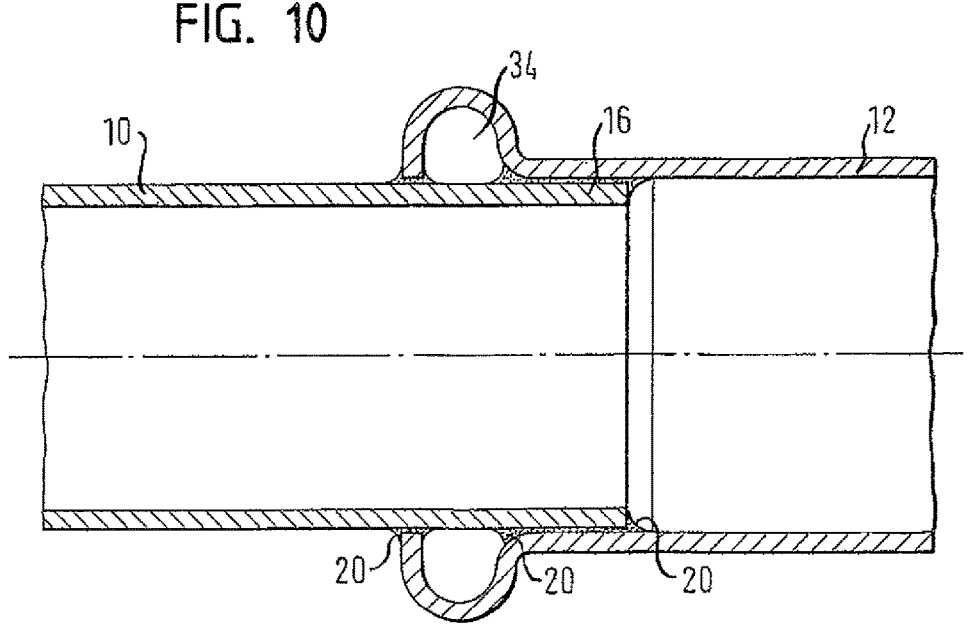

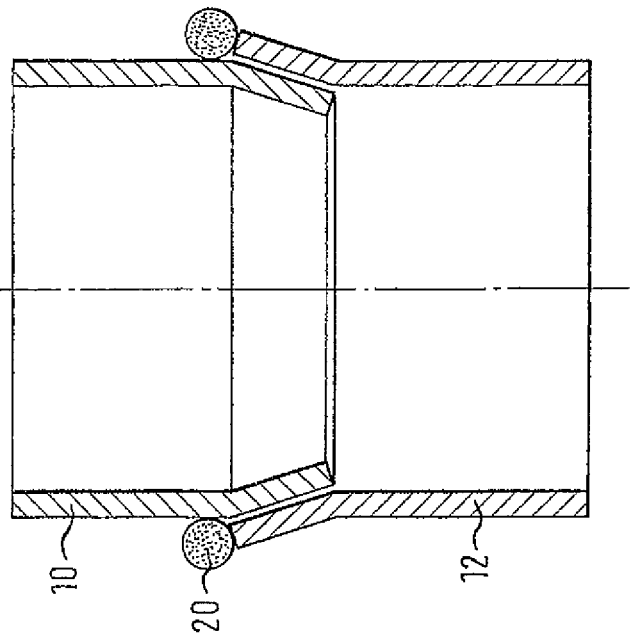
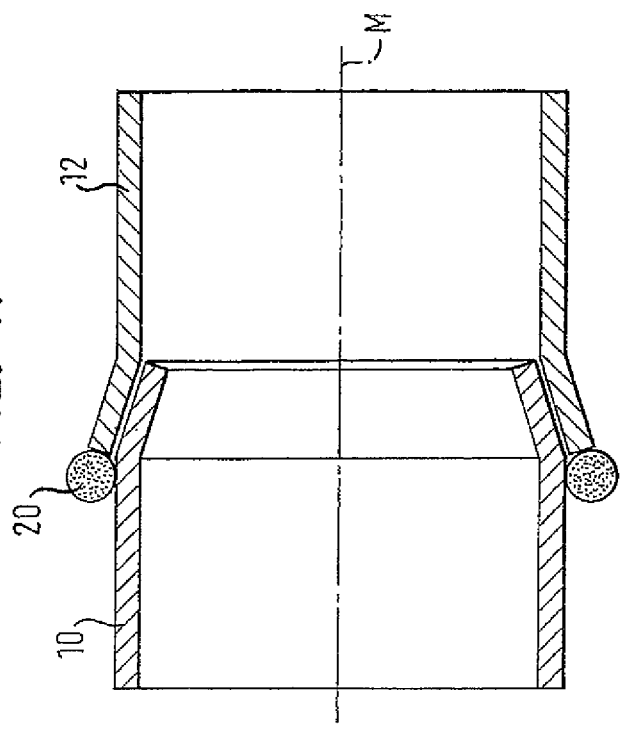

EXHAUST SYSTEM

RELATED APPLICATIONS

This application is a continuation-in-part of U.S. patent application Ser. No. 11/573,009, filed Jan. 10, 2008, now abandoned, which is a U.S. national counterpart application of international application serial no. PCT/EP2005/007191 filed Jul. 4, 2005, which claims priority to German Patent Application No. 10 2004 038099.6 filed Aug. 5, 2004.

TECHNICAL FIELD

The invention relates to an exhaust gas system, in particular for a motor vehicle, as well as to a method of connecting two components of an exhaust gas system in particular for a motor vehicle.

BACKGROUND

The components which are to be connected with each other are in particular the pipes of the exhaust gas system, which conduct the exhaust gas flow from an outlet manifold to a catalytic converter or a silencer, for example. With regard to the high temperatures and the high dynamic stresses to which the components of an exhaust gas system are exposed, such components hitherto always have been connected through a weld seam. In fact, there arise some disadvantages if the components of an exhaust gas system are welded to each other. For one thing, for carrying out the method comparatively much floor space is needed for an automatic welding machine or a welding robot, for instance. In both cases, the components which are to be welded to each other have to be moved relative to the welding head. This is why complex devices are required for the fixation of the components to be welded to each other, accompanied by high dynamic loading. These devices have a relatively high space requirement in the welding cabin and for their storage. Moreover, very many devices have to be kept in stock because for each design a new device is required as a general rule. In addition it has turned out that a weld seam has a detrimental effect on the strength. Specifically, the weld seam results in an abrupt change in cross-section of the connected components and correspondingly in an alteration of the rigidity of the exhaust gas system, giving rise to a stress concentration in the region of the weld seam. It is in particular the region of the weld seam root or undercut which possibly is the origin for the formation of cracks. Finally, the heat which is introduced into the two components during welding results in a welding-provoked distortion which after welding has to be individually corrected on a straightening bench, if necessary. Despite of all these disadvantages it has generally become accepted in the field of exhaust gas systems to weld components to each other; it is the prevailing opinion in prior art that this is the only way to create a connection of components which withstands the occurring temperature stresses and dynamic stresses.

SUMMARY

Two components of an exhaust gas system are connected in a way other than by welding in order to avoid the above-mentioned disadvantages.

An exhaust gas system comprises a first exhaust component and a second exhaust component with an induction solder joint between the two components. A method of connecting a first exhaust component of a vehicular exhaust gas system with a second exhaust component includes the steps of putting the two exhaust components together such that they are spaced apart by a solder gap, providing a high temperature solder material near the solder gap, and heating the two components up in the region of the solder material with an inductor to a temperature which lies above the melting temperature of the solder material to fill the solder gap and form a soldered connection between the first and second exhaust components.

The invention is based on the surprising cognition that, contrary to the prejudices prevailing among experts, a high temperature soldered connection withstands the stresses which act on a vehicular exhaust gas system. Up to now it was generally assumed that a soldered connection is out of the question, merely because of the temperatures which may occur in the components of the exhaust gas system and possibly lie above 600 degrees Celsius. The maximum allowable operating temperature of soldered components was generally seen to be at approximately 200 degrees Celsius, even if a high temperature solder was used (see for instance the draft of the bulletin DVS 938-2 "Electric Arc Soldering" (Lichtbogenschwei.beta.en) of the German Association for Welding Technology (Deutscher Verband fur Schwei.beta.technik) of October 2002, in which an operating temperature for soldered connections for exhaust gas systems is indicated with 180 degrees Celsius, at most, and an employment of soldered connections with temperatures of more than 180 degrees Celsius is explicitly not recommended). This prejudice is ignored because the Applicant has found out in experiments that soldered components can be exposed even for longer periods of time to temperatures of more than 600 degrees Celsius without any impairment of the mechanical stability of the soldered connection. The fact that after solidification of the solder material a re-melting temperature arises which is higher than the initial melting temperature, additionally has a favorable effect on the high temperature strength of the soldered connection. The reason for this is not conclusively clarified yet.

One reason could lie in the fact that certain by-alloys evaporate during melting. A further reason could be the diffusion of atoms of the base material into the solder material.

It is also known in the art of induction soldering that the gap between the two components to be attached to each other must be exactly controlled within a very tight tolerance range. Specifically, known specifications for induction soldering have indicated that the gap width must be in the range of 0.02-0.10 mm in order for the joint to perform as required. This type of controlled range is not possible within the field of exhaust systems. As such, induction soldering for connecting exhaust components simply has not been considered as a viable option.

Again, this well-known convention is ignored because unexpectedly, the Applicant has further discovered that the solder gap between the first and second exhaust components can be as great as 1.20 mm. In one example, the solder gap is within a range defined as greater than 0.10 mm and up to 0.70 mm. This provides a significant cost savings as the tolerances for the soldered joint have less severe requirements.

Employing a soldered connection between two exhaust components instead of a welded connection also entails a number of additional advantages. For one thing, the two components can be connected with each other with a lower expenditure and smaller space requirement as is the case with employing a welding method. It is not required that a robot travels around the two components in the region of their connection in circumferential direction. Instead of that, it is possible to accommodate the connection region between the two components in a compact shielding gas chamber. Up to a particular temperature, which is lower than the operating temperature occurring in exhaust gas systems, the dynamic strength of the soldered connection is higher than with a welded connection because no abrupt changes in rigidity are produced. It is also possible to form the two components with a smaller wall thickness if they are soldered instead of welded to each other. That is to say, the wall thickness of components which are to be welded to each other has to be designed in the field of exhaust gas systems in some cases not in view of the required strength of the components, but rather with regard to the risk of a melting-through during welding. This risk will be dropped if the two components are soldered with each other, so that in the future only the occurring stresses will be relevant for dimensioning. It is also possible to replace flange and clamping piece connections with a soldered connection. Due to their high assembly expenditure and because of problems in terms of leak tightness, such connections more and more turn out to be disadvantageous, so that one proceeds to produce all components of the exhaust gas system in the form of an integral joint.

According to one example, provision is made that one of the components has a support surface for solder. This makes it possible to arrange the solder near the solder gap, so that the solder material is drawn into the solder gap by capillary forces as soon as the solder is molten. In this process, the support surface prevents the solder material from flowing away from the solder gap toward other regions of the component. On the one hand, the solder material would be undesirable at these regions because of visual reasons, and on the other hand this solder material would no longer be available for the actual soldered connection.

The support surface on the component can be formed with low expenditure by a surrounding bead on which the solder ring may be arranged.

According to another example, provision can be made to arrange a solder support in the region of the solder joint, which solder support comprises the support surface for the solder material. This embodiment has the advantage that the component itself does not have to be deformed in order to form the support surface. It will be preferred that the solder support consists of a material which is electrically non-conductive, for instance of a ceramic material. As such, during the induction soldering process, the solder support will not be inductively heated so that the solder material is not bonded to the solder support. Thus, the latter can be removed without any problems when the two components are soldered to each other.

According to another example, a runout region is provided between the two components. The runout region receives excessive solder without the latter having made a connection with the two components. So the runout region acts in the nature of an overflow container which will be filled when the solder gap is completely filled up with the solder material. The runout region is not heated up during soldering to soldering temperature, so that the solder material begins to solidify as soon as it enters the runout region. This guarantees that the solder material will not escape on the side facing away from the solder gap, resulting in undesired solder drops in the interior of the two components. Such a solder drop could cause damages in the interior during operation of the exhaust gas system.

Advantageous embodiments of the invention will be apparent from the sub-claims.

BRIEF DESCRIPTION OF THE DRAWINGS

The invention will be described in the following on the basis of various embodiments which are illustrated in the attached drawings in which:

FIG. 3 schematically shows according to a second embodiment of the invention two components which are to be soldered to each other;

FIG. 4 shows the two components of FIG. 3 in the soldered state;

FIG. 5 shows on an enlarged scale the detail V of FIG. 4;

FIG. 6 schematically shows according to a third embodiment of the invention two components which are to be soldered to each other;

FIG. 7 shows the two components of FIG. 6 in the soldered state;

FIG. 8 shows on an enlarged scale the detail VIII of FIG. 7;

FIG. 9 schematically shows according to a fourth embodiment two components which are to be soldered to each other;

FIG. 10 shows the components of FIG. 9 in the soldered state;

FIG. 11 schematically shows according to a fifth embodiment two components which are to be soldered to each other;

FIG. 12 shows the components of FIG. 11 in another position during soldering.

DETAILED DESCRIPTION

Figure 1:
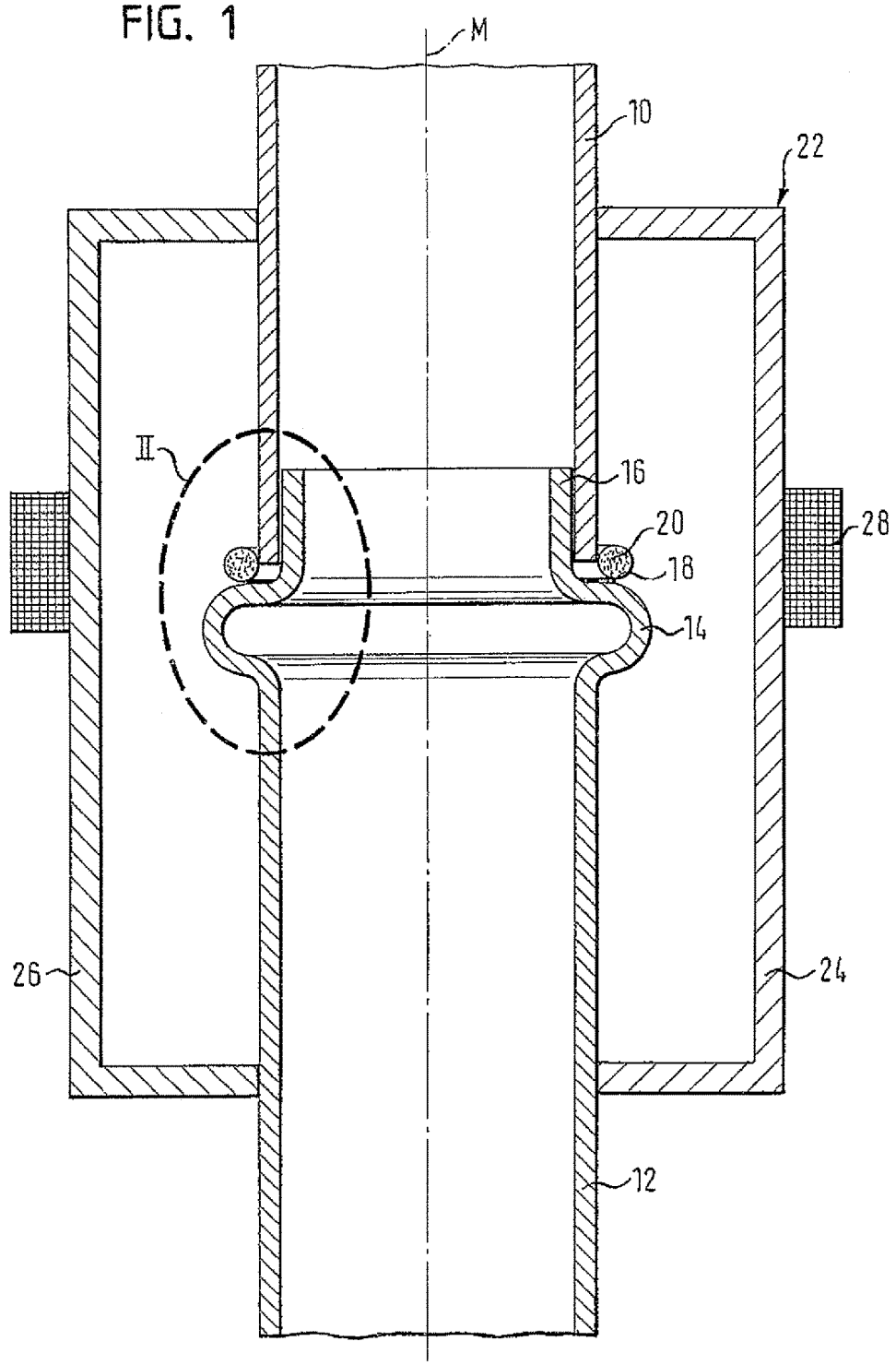
FIG. 1 schematically shows according to a first embodiment of the invention two components which are to be soldered to each other, arranged in a soldering device.

FIG. 1 shows two components 10, 12 which in this case are two pipes of an exhaust gas system for motor vehicles. At this point it is referred to the fact that components other than pipes basically can be connected to each other, too, for instance funnels with pipes, funnels with housings, etc.

The first component 10 is configured to have a constant cross-section, while the end of the second component 12 facing the first component 10 is configured with a bead 14 facing outwards. Adjacent to the bead 14 is an inserting portion 16. The inserting portion 16 has an outer diameter which is slightly smaller than the inner diameter of the first component 10.

The area of the bead 14, facing the component 10 and aligned perpendicular to a middle axis M, forms a support surface 18 on which a ring of solder material 20 is arranged. Thus, the solder material lies in the region of a solder gap which is formed between the inserting portion 16 of the second component 12 and the first component 10. The solder material 20 is a high temperature solder on a copper or nickel basis.

Although a solder ring is shown in the embodiments, the solder can, of course, be provided in other forms, for instance as a sheet metal strip, paste etc.

Arranged around the region of the two components 10, 12 to be soldered, is a soldering device 22 which essentially includes two shells 24, 26 that enclose the region to be soldered in a virtually gas-tight manner. A shielding gas atmosphere within the shells 24, 26 can be produced by a suitable (not shown) device. An inductor 28 extends around the two shells 24, 26 and generates eddy currents in the region of the portions of the two components 10, 12 to be soldered to each other, of the two components 10, 12 as well as in the solder material 20. Due to the electric resistance, these eddy currents are converted into heat.

Figure 2:
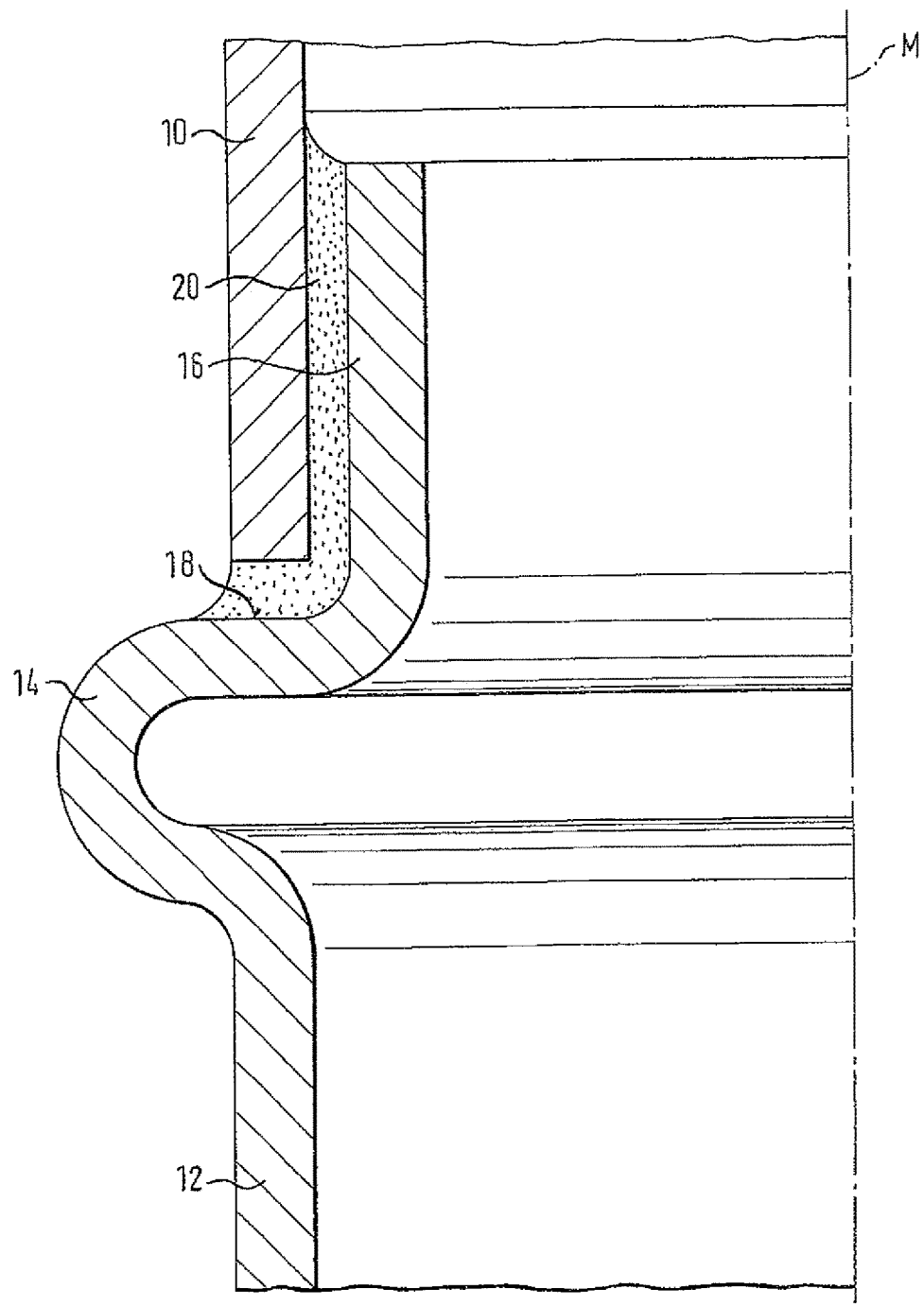
FIG. 2 shows on an enlarged scale the detail II of FIG. 1, after the two components have been soldered to each other.

For soldering the two components 10, 12 to each other, the ring of solder material 20 is arranged on the bead 14 of the second component 12 in a first step. Then the second component 12 is inserted with the inserting portion 16 into the first component 10. Subsequently the two shells 24, 26 are closed around the portion of the two components 10, 12 which is to be soldered, and a shielding gas atmosphere is developed in the interior of the two shells. Then the portions of the two components 10, 12 to be soldered, of the two components 10, 12 as well as the solder material 20 will be heated up with the inductor 28 to a temperature in the range of 1000 degrees Celsius. In this process, the solder material 20 melts, so that it will be drawn by capillary forces and against gravity into the solder gap between the two components 10, 12 and completely fills the gap. This can be seen in FIG. 2. The support surface 18 on the bead 14 ensures that the solder material 20 when melting does not flow downward away from the solder gap, but will be drawn into the solder gap. As an alternative, the soldering process could also be performed in a horizontal or oblique orientation.

When the two components 10, 12 are cooled off so far that a scaling in air will not occur any more, the two shells 24, 26 can be opened and the components, which now are connected with each other, can be removed. The soldering device is ready for receiving the next components. The particular advantage of the soldering device and of the induction soldering method performed with it lies in the fact that very short processing times are possible. The achievable processing time for the brazing of two components including heating and cooling lies in the range of 40 seconds, and in fact—in contrast to welding—independent of the seam length. Consequently, a high output can be achieved with a small space requirement.

FIGS. 3 to 5 show a second embodiment. For the components known from the first embodiment the same reference numerals will be used, and in this respect reference is made to the above explanations.

The difference to the first embodiment is that the support surface 18 is not formed on one of the components itself, but on a solder support 30 which here is formed as a closed ring.

The solder support 30 is made of a material which is electrically non-conductive, for instance a ceramic material, and encloses the second component 12 adjacent to the solder gap. In other words, the first component 10 is slid on the second component 12 until it rests against the solder support 30. This allows the solder support 30 to be used as a reference for the positioning of the two components 10, 12 relative to each other. The face of the solder support 30 facing the first component 10 forms the support surface 18 on which the ring of solder material 20 will be arranged. It is possible to provide corrugations, projections or grooves on the solder support, when it is configured as a closed ring, which make it easier for the solder to flow underneath the end face of the component 10 into the solder gap.

The region of the two components 10, 12 which is to be soldered is heated like in the first embodiment by the soldering device (not illustrated here), so that the solder material 20 melts and is drawn into the solder gap between the two components 10, 12 (see FIGS. 4 and 5). In this process, a small part of the solder material flows past the solder support 30 in downward direction. As the solder support 30 is comprised of an electrically non-conductive material, however, it will not be heated by the inductor 28, so that the solder solidifies in this region. This is why only a very small part of the solder material is not available for the actual soldered connection. In FIG. 5 the soldered connection between the two components 10, 12 can be seen, after the solder support 30 has been removed. This can be done without any problems, because during soldering the solder support 30 is not heated up so far that the soldering temperature is reached. The solder material 20 accordingly does not get bonded to the surface of the solder support. The "impression" of the solder support 30 can be seen clearly.

FIGS. 6 to 8 show a third embodiment. Even here, the same reference numerals are used for those components which are known from the preceding embodiments.

The difference to the first embodiment lies in the fact that in the third embodiment the support surface 18 is formed on an end portion of the second component 10, which is expanded in the manner of a funnel. Thus, the ring of solder material 20 lies directly between the first component 10 and the second component 12. A further difference lies in the fact that the solder gap between the first and second components 10, 12 is configured such that a runout region 32 for the liquid solder material is formed. The runout region is defined in that it lies outside the region of the two components 10, 12 that is heated up by the inductor 28; thereby the runout region 32 will remain at a temperature, which is less than the solidification temperature of the solder material 20, even during the actual soldering operation.

When the two components 10, 12 are soldered to each other, the region of the solder gap is heated by the inductor. As soon as the solder material 20 is molten, it will be drawn by the capillary forces into the solder gap in which it wets the surface area of the two components 10, 12. As soon as the solder material reaches the lower portion of the solder gap with respect to FIG. 7, it escapes from the actual solder gap and enters the runout region 32. As the latter has a temperature which is lower than the solidification temperature of the solder material 20, the solder material solidifies in the runout region 32. The runout region 32 is chosen to have a sufficient length in order to prevent the solder material from escaping on the lower side of the solder gap and from entering the interior of the two components 10, 12. In FIG. 8 one can see that the solder material 20 does not wet the surface area of the two components 10, 12 in the runout region 32, because they have a comparably low temperature.

According to this, the end face of the solder material 20 is not concave, as can be seen at the upper end of the solder gap, but convex.

FIGS. 9 and 10 show a fourth embodiment of the invention. The difference to the preceding embodiments lies in the fact that a receiving chamber 34 is provided within which the solder material 20 is arranged. Unlike the preceding embodiments the solder material 20 in this case does not have to be arranged as a completely surrounding ring. It is sufficient that the solder material extends, for instance, only around the half of the circumference of the annular receiving chamber 34. As soon as the solder has melted, it will be spread along the entire circumference of the solder gap due to the capillary forces, so that a surrounding and gas-tight connection between the two components is established.

When the region of the components 10, 12, which are to be soldered to each other, is heated up to a temperature above the melting temperature of the solder material 20, the solder material which will be liquid at this time is drawn into the gap between the two components 10, 12 by capillary forces. Two distinct solder joints are formed in this process, namely a first solder joint between the end face of the second component 12 and the outer side of the first component 10, i.e. related to FIG. 10 on the left side of the receiving chamber, and a second solder joint between the inserting portion 16 of the first component 10 and the second component 12.

FIG. 11 shows a fifth embodiment of the invention. The difference to the preceding embodiments lies in the fact that the first component 10 has its end provided with a constriction in the shape of a truncated cone, whereas the second component has its end provided with a funnel-shaped flaring. The constriction of the first component is arranged in the flaring of the second component. The solder material 20 directly rests against the end face of the flaring of the second component 12. As soon as the solder material melts, it will be drawn into the solder gap by the capillary forces, so that a uniform connection between the first and second components will be obtained.

FIG. 12 shows the components known from FIG. 11, but unlike FIG. 11 the longitudinal axis of the two components 10, 12 is arranged vertically instead of horizontally. Hence, the end face of the flaring of the second component 12 serves as the support surface 18 for the solder material 20.

Figure 13:
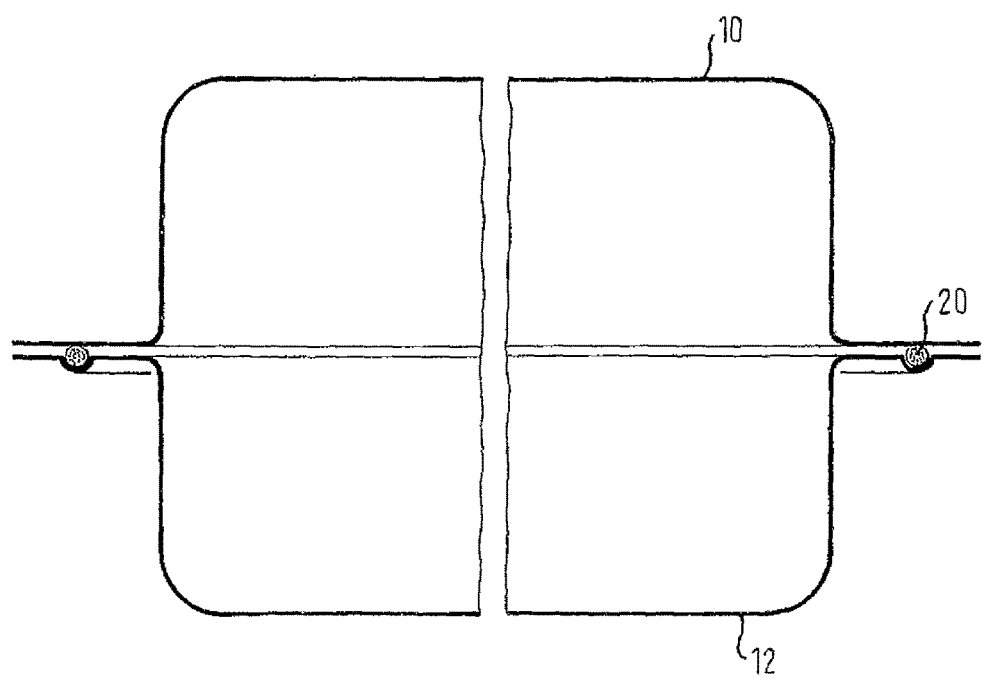
FIG. 13 schematically shows according to a sixth embodiment two components which are to be soldered to each other.

FIG. 13 shows a sixth embodiment. The difference to the preceding embodiments is that there are no pipes which are soldered to each other. Instead, two housing parts of a silencer, a catalytic converter, or other constituent of an exhaust gas system are soldered together. The first component 10 forms the upper shell of the housing and the second component 12 forms the lower shell of the housing. Both components are provided with a surrounding rim, with the rim of the second component being provided with a surrounding bead, so that in combination with the rim of the first component a chamber for receiving the solder material 20 is formed.

The rims of the first and second components 10, 12, as well as the solder material 20, are inductively heated so that the solder material melts and the two components are connected with each other. It is remarkable here that even with these types of components with a very large seam length, the processing time is not increased. If the two components were to be welded to each other, this would result in a processing time of several minutes because of the large seam length.

Figure 14:
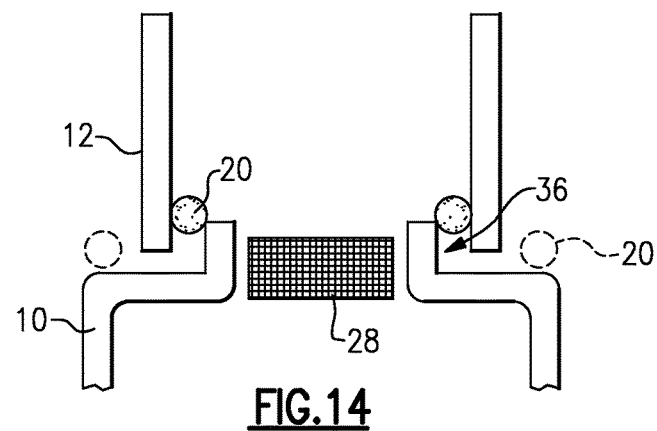
FIG. 14 schematically shows another example of two exhaust components which are to be soldered together.

FIG. 14 shows another example of first 10 and second 12 exhaust components that are connected to each other with an induction soldered (brazed) joint. The first 10 and second 12 exhaust components are spaced apart from each other by a solder gap 36 that can be as great as 1.20 mm. A portion of the first exhaust component 10 is inserted into an opening in the second exhaust component 12. The high temperature induction material 20 is positioned near the solder gap 36. In this configuration, the inductor 28 must be positioned within the first component near the solder gap 36. The inductor 28 generates eddy currents in this region of the two exhaust components 10, 12 to be soldered to each other as well as in the solder material 20. Due to the electric resistance, these eddy currents are converted into heat which melts the solder material 20 causing it to fill the solder gap 36. Further, as the inductor 28 is positioned internally relative to the first exhaust component 10 the amount of thermal expansion of the first exhaust component 10 is greater than the thermal expansion of the second component such that the size of the gap is reduced during soldering/brazing.

As discussed above, the solder gap 36 between the exhaust components 10, 12 can be as large as 1.20 mm, which directly contradicts teachings of the prior art, which teaches that induction soldered joints should only be used for components having a solder gap within the range of 0.02 mm-0.10 mm. Such a tightly controlled range is not practical in exhaust systems, which is why induction soldering has not previously been used for such components. However, it has been discovered that secure induction soldered joints can be formed between exhaust components having a solder gap of 1.20 mm. This provides a cost savings for the manufacture and assembly of the components.

While such a large gap is not preferred due to the increased amount of solder material that will be required. A typical solder gap would be within the range of being greater than 0.10 mm up to 0.70 mm. In one example, the preferred solder gap size would be approximately 0.50 mm as this still provides a more tolerable gap size without requiring a significant amount of additional solder material.

The solder material 20 is a high temperature solder comprised of a copper or nickel-alloy material, for example. When using a nickel-alloy material the brazing/soldering temperature would be approximately 1300 degrees Celsius and the operating temperature would be within a range of 1000-1100 degrees Celsius.

Portions of the two components 10, 12 to be soldered, as well as the solder material 20 will be heated by the inductor 28 up to the specified temperature. At this temperature the solder material 20 melts and is drawn by capillary forces into the solder gap 36 between the two components 10, 12 and completely fills the gap.

In the example of FIG. 14, the first exhaust component 10 comprises a first exhaust pipe and the second exhaust component comprises a second exhaust pipe; however, the first and second exhaust components can comprise any type of exhaust component that would be utilized in a vehicle exhaust system. For example, the first and second exhaust components could comprise pipes, flange connectors, muffler shells, end plates, etc. FIGS. 14-24 show various examples of different types of components and brazing configurations but it should be understood that there are numerous other examples that could also be utilized with the claimed soldering/braking process. Further, each of the configurations include a solder gap that can be as large as 1.20 mm. The solder gap 36 is exaggerated in FIG. 14 for description purposes; however, it should be understood that a similar gap configuration is also applicable to the other example configurations.

Figure 15:
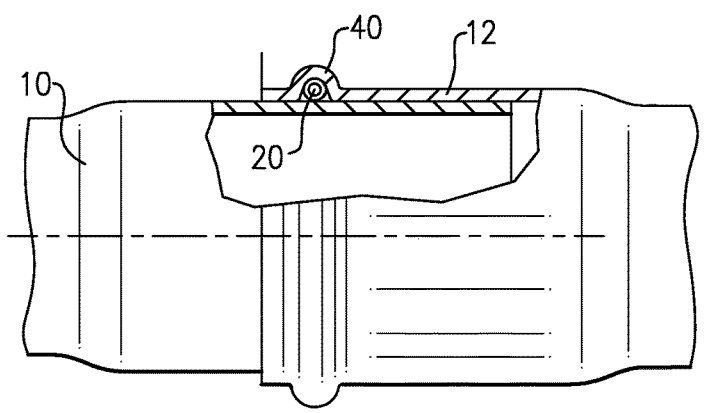
FIG. 15 schematically shows another example of two exhaust components which are to be soldered together.

FIG. 15 shows a configuration where the solder material 20 is positioned within a groove 40 formed within the second exhaust component 12 which is located externally to the first exhaust component 10 at the induction solder joint.

Figure 16:
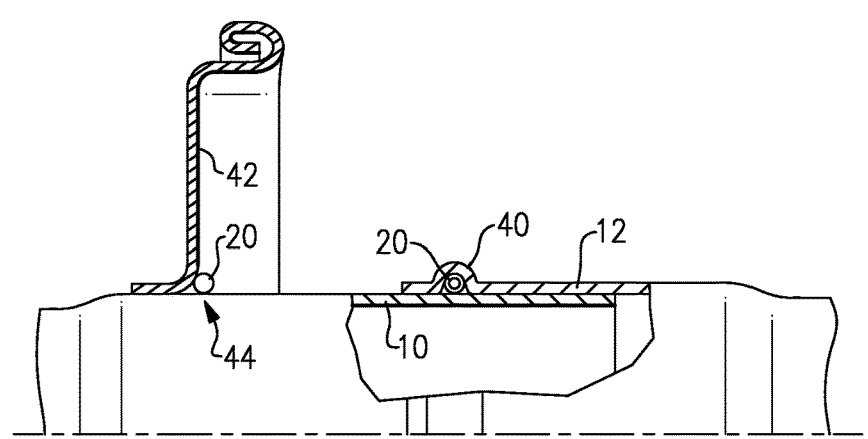
FIG. 16 schematically shows another example of two exhaust components which are to be soldered together.

FIG. 16 shows an example configuration similar to FIG. 15, but which also connections an end plate 42 that is attached to the first exhaust component 10. A second induction soldered joint 44 could also be used to connect the end plate 42 to the first exhaust component 10 in the manner described above.

Figure 17:
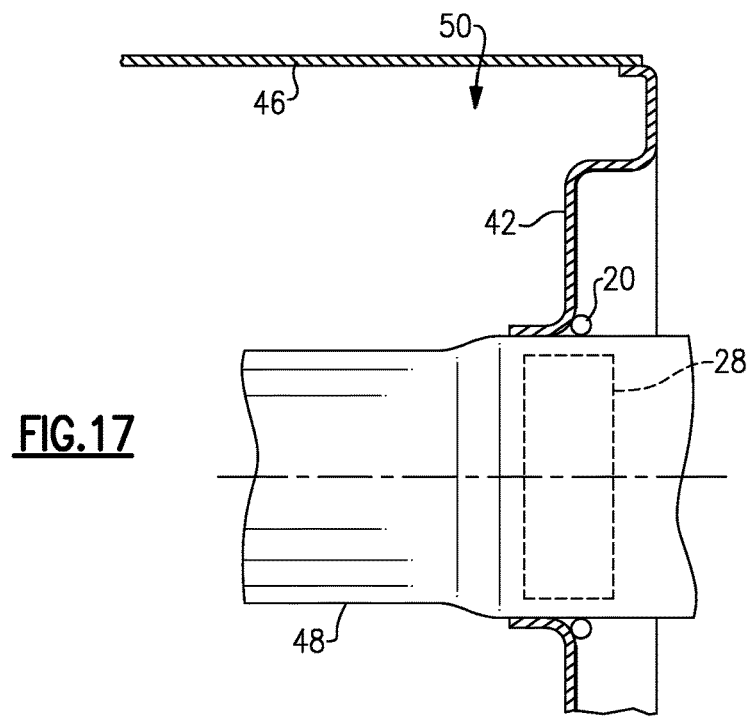
FIG. 17 schematically shows another example of two exhaust components which are to be soldered together.

FIG. 17 shows a configuration for a muffler 46 that includes an end plate 42 and an internal muffler pipe 48 that are connected to each other with an induction soldered joint. The solder material 20 is positioned external to a muffler cavity 50 and rests on the outer surface of a portion of the internal muffler pipe 48 that extends outward of the end plate 42. The inductor 28 is positioned internally of the muffler pipe 48 and the induction soldered joint is formed in the manner described above.

Figure 18:
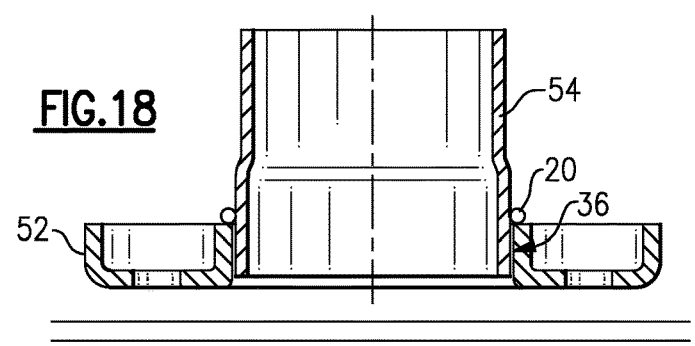
FIG. 18 schematically shows another example of two exhaust components which are to be soldered together.
Figure 19:
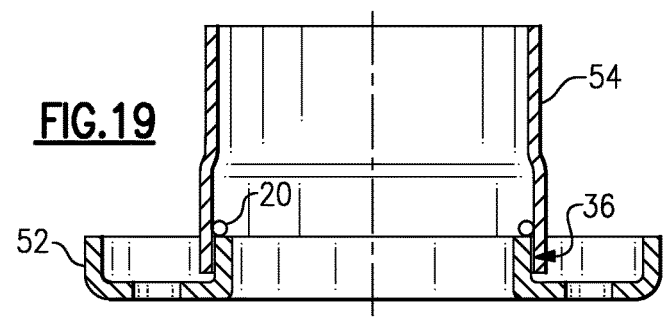
FIG. 19 schematically shows another example of two exhaust components which are to be soldered together.

FIGS. 18 and 19 each show a configuration where a sheet flange 52 is attached to a pipe or cone component 54. FIG. 18 shows the sheet flange 52 being positioned external to the pipe or cone component 54 with the solder material 20 being externally located and resting on an upper edge of the sheet flange 52. FIG. 19 shows the sheet flange 52 being positioned internal to the pipe or cone component 54 with the solder material 20 being internally located and resting on the upper edge of the sheet flange 52. In either configuration the inductor 28 would be internally positioned as described above.

Figure 20:
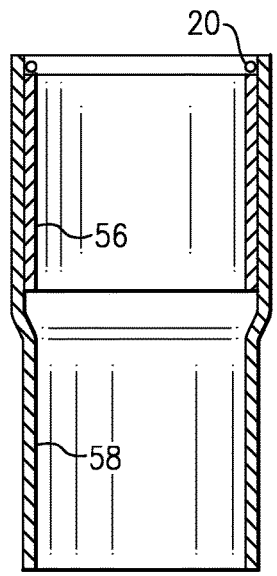
FIG. 20 schematically shows another example of two exhaust components which are to be soldered together.
Figure 21:
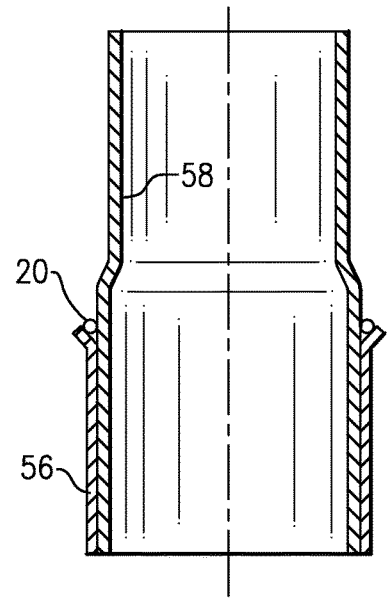
FIG. 21 schematically shows another example of two exhaust components which are to be soldered together.

FIGS. 20 and 21 each show a configuration where a bushing 56 is attached to an exhaust pipe 58 with an induction solder joint. FIG. 20 shows a configuration where the bushing 56 is positioned entirely within the pipe 58 and the solder material 20 rests on an upper edge of the bushing 56. FIG. 21 shows a configuration where the bushing 56 surrounds an external surface of the exhaust pipe 58 with the solder material 20 be externally located and resting on an upper edge of the bushing 56. In the example shown in FIG. 21, the upper edge of the bushing 56 includes a flared portion; however, the upper edge could be also be straight such as that shown in FIG. 20. In either configuration the inductor 28 would be internally positioned as described above.

Figure 22:
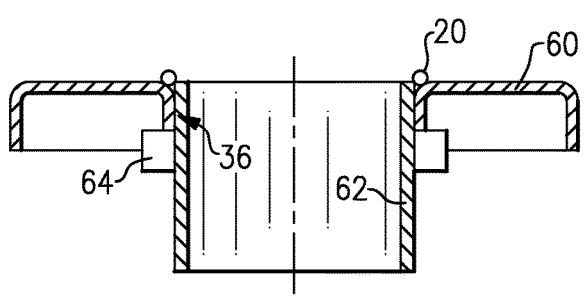
FIG. 22 schematically shows another example of two exhaust components which are to be soldered together.

FIG. 22 shows a configuration where an endplate or cover 60 is attached to an exhaust pipe 62. The exhaust pipe 62 is inserted into an opening within the cover 60 and a stopper 64 surrounds an outer surface of the pipe 62 to hold the cover 60 in place. The solder material 20 is externally positioned at the interface between the cover and the pipe. The stopper 64 also serves to prevent melted solder material from flowing out of the solder gap 36.

Figure 23:
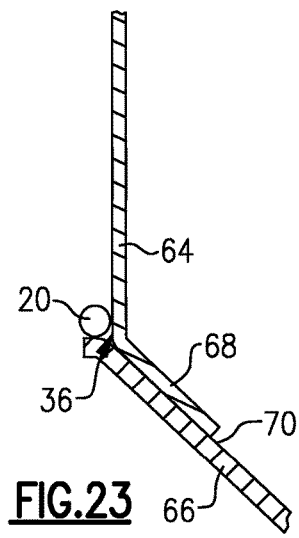
FIG. 23 schematically shows another example of two exhaust components which are to be soldered together.

FIG. 23 shows a configuration where an exhaust pipe 64 is connected to a cone 66 with an induction solder joint. The pipe 64 includes a tapered portion 68 that is separated from a corresponding tapered portion 70 of the cone 66 by the solder gap 36. The pipe 64 is positioned internally to the cone 66 and the solder material is externally positioned on an upper edge of the cone 66. The upper edge of the cone 66 could be flared as shown, or optionally, the upper edge could be straight.

Figure 24:
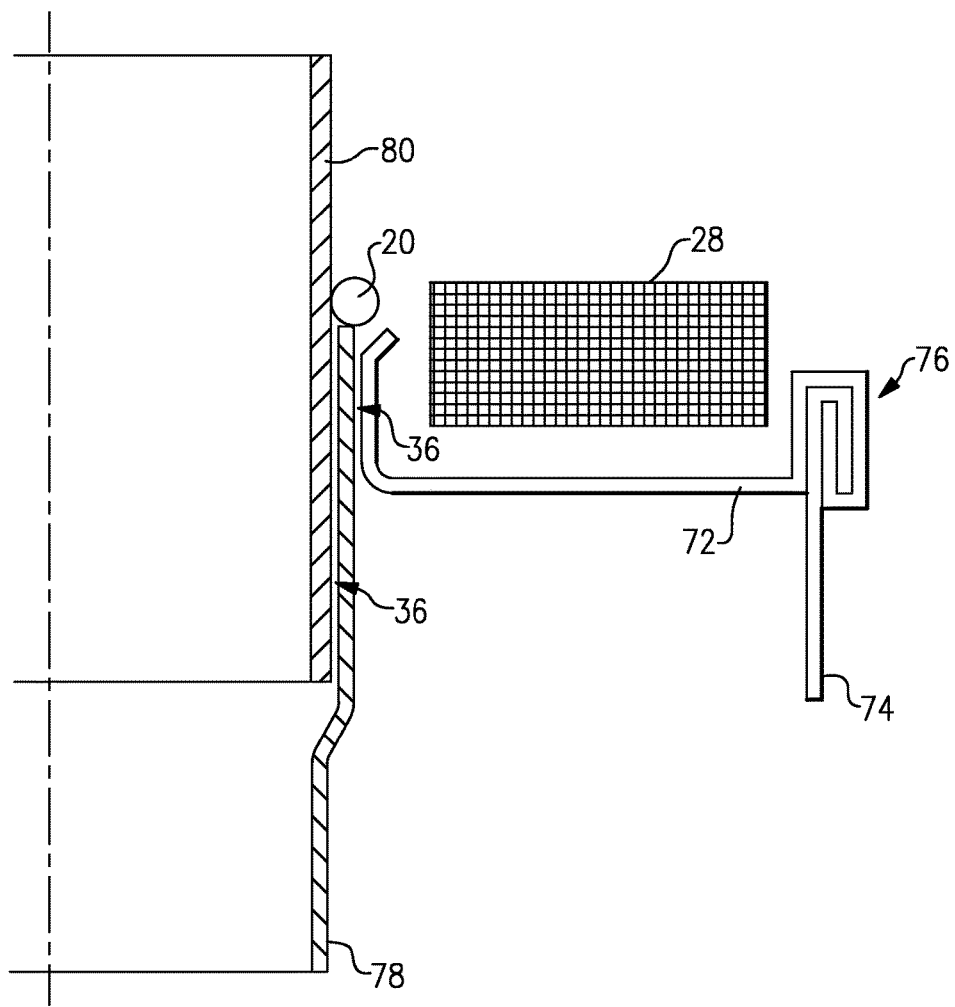
FIG. 24 schematically shows an example of three exhaust components which are to be soldered together.

FIG. 24 shows a multi-joint configuration where three different exhaust components are connected together with an induction solder joint. An end plate 72 is attached to a muffler shell 74 with a crimped connection 76, for example. The end plate 72 is connected to an internal muffler pipe 78, which is connected to an external exhaust pipe 80 that connects to the remaining portion of the vehicle exhaust system. An outer end of the internal muffler pipe 78 is positioned between the external exhaust pipe 80 and the end plate 72. Solder gaps 36 are thus formed between the external exhaust pipe 80 and the internal muffler pipe 78 and between the internal muffler pipe 78 and the end plate 72. The solder material 20 rests on upper edge of the middle component, i.e. the outer end of the internal muffler pipe 78, and is drawn into the solder gaps 36. In this example configuration, the inductor 28 is located externally to the induction soldered joint, i.e. the inductor is located externally to the muffler 78 and exhaust 80 pipes.

In principle, all components of an exhaust gas system can be connected with each other with the method described above. In this respect it is of no significance whether the components are soldered to each other in succession, simultaneously in groups, or all of them at the same time. It is also possible to solder different materials to each other. It is possible, for example, to solder tail pipes—which consist of non-ferrous metals and, with this, of a material different from that of the actual exhaust gas pipes—to the exhaust pipes.

What is claimed is:

1. An exhaust component assembly comprising:
   a first exhaust component and a second exhaust component having first and second generally tubular openings;
   wherein the second exhaust component is positioned relative to said first exhaust component to form an annular solder gap between said first and said second generally tubular openings, the annular solder gap having a radial dimension that can be as great as 1.20 mm; and
   a soldered joint formed between said first and said second generally tubular openings at said annular solder gap, said soldered joint formed by inducing eddy currents from an induction coil into a ring of solder material placed near said annular solder gap to heat and melt said ring of solder material without said induction coil making contact with said solder material, and to fill said annular solder gap.

2. The exhaust component assembly according to claim 1 wherein said annular solder gap is greater than 0.10 mm.

3. The exhaust component assembly according to claim 2 wherein said annular solder gap is equal to or less than 0.70 mm.

4. The exhaust component assembly according to claim 1 wherein said annular solder gap is within a range of more than 0.10 mm and equal to or less than 0.50 mm.

5. The exhaust component assembly according to claim 1 wherein said first exhaust component comprises an exhaust pipe providing the first tubular opening and said second exhaust component comprises one of a second exhaust pipe, a connecting flange, a cone, or a muffler shell that provides the second tubular opening.

6. The exhaust component assembly according to claim 5 wherein said first and second exhaust components are directly connected to each other without any intervening structures by said induction soldered joint.

7. The exhaust component assembly according to claim 1 wherein said first and second exhaust components are solely connected to each other by said induction soldered joint.

8. The exhaust component assembly according to claim 1 wherein a portion of said first exhaust component is inserted within an opening of said second exhaust component, and wherein an entirety of said ring of solder material is subject to simultaneous application of the eddy currents from the induction coil to transform said ring of solder material into melted solder material that fills said annular solder gap.

9. The exhaust component assembly according to claim 1 wherein said first and second exhaust components cooperate to define an exhaust gas flow path that receives heated exhaust gas from an engine.

10. The exhaust component assembly according to claim 1 wherein one of said first and said second exhaust components is configured for attachment to an additional exhaust component comprising a silencer or catalytic converter.

11. An exhaust component assembly comprising:
a first exhaust component having a first tubular opening;
a second exhaust component having a second tubular opening and being positioned relative to said first exhaust component to form an annular solder gap between said first and said second exhaust components, the annular solder gap having a radial dimension that can be as great as 1.20 mm; and
a soldered joint formed between said first and said second exhaust components at said annular solder gap,
said solder joint formed by inducing eddy currents from an induction coil into a ring of solder material placed near said annular solder gap to heat and melt said ring of solder material without said induction coil making contact with said ring of solder material, and to fill said solder gap, and
wherein said first and second exhaust components define an exhaust gas flowpath for heated engine exhaust gases.

12. The exhaust component assembly according to claim 11 wherein said soldered joint comprises a brazed joint.

13. The exhaust component assembly according to claim 12 wherein said annular solder gap is greater than 0.10 mm.

14. The exhaust component assembly according to claim 13 wherein said annular solder gap is equal to or less than 0.70 mm.

15. The exhaust component assembly according to claim 12 wherein said annular solder gap is within a range of more than 0.10 mm and equal to or less than 0.50 mm.

16. The exhaust component assembly according to claim 12 wherein said first and second exhaust components comprise silencer housing sections.

17. The exhaust component assembly according to claim 12 wherein said first and second exhaust components comprise catalytic converter housing sections.

18. The exhaust component assembly according to claim 12 wherein one of said first and said second exhaust components is configured for attachment to an additional exhaust component comprising a silencer or catalytic converter.

19. The exhaust component assembly according to claim 12 wherein said exhaust gas flowpath directs the heated engine exhaust gases to a tailpipe located downstream of said first and said second exhaust components.

20. An exhaust component assembly comprising:
a first exhaust component having a first tubular opening;
a second exhaust component having a second tubular opening and being positioned relative to said first exhaust component to form an annular solder gap between said first and said second exhaust components, the annular solder gap having a radial dimension that can be as great as 1.20 mm;
a ring of solder material transformable from an initial non-melted condition to a melted condition, said ring of solder material being supported directly against at least one of said first and second exhaust components when in said initial non-melted condition; and
a soldered joint formed subsequently to said ring of solder material being in said initial non-melted condition between said first and said second exhaust components at said annular solder gap when said solder material hardens after being in said melted condition.

21. The exhaust component assembly according to claim 20 including a solder support surface formed on at least one of said first and second exhaust components to hold said ring of solder material in direct abutment against said at least one of said first and exhaust components prior to said ring of solder material transforming from a non-melted condition to a melted condition, and wherein an entirety of said ring of solder material is subject to simultaneous application of the eddy currents from the induction coil to transform said ring of solder material from the non-melted condition to the melted condition.

22. The exhaust component assembly according to claim 21 wherein said solder support surface comprises a bead, shoulder, or bent end portion of said at least one of said first and second exhaust components.

23. The exhaust component assembly according to claim 20 including a solder support positioned adjacent said at least one of said first and second exhaust components to support said solder material and hold said solder material in direct abutting engagement against said at least one of said first and second exhaust components prior to said solder material transforming to said melted condition.

24. The exhaust component assembly according to claim 20 wherein said solder joint is formed by simultaneously inducing eddy currents from an induction coil into an entirety of said ring of solder material placed against said at least one of said first and second exhaust components near said annular solder gap to heat and melt said solder material without the induction coil contacting said solder material and to fill said annular solder gap.

25. The exhaust component assembly according to claim 20 wherein said solder material is continuously held directly against said at least one of said first and second exhaust components during transformation from said non-melted condition to said melted condition.

26. An exhaust component assembly comprising:
a first exhaust component;
a second exhaust component positioned relative to said first exhaust component to form an annular solder gap between said first and said second exhaust components, said annular solder gap having a radial dimension that can be as great as 1.20 mm;
a ring of non-melted solder material supported directly against at least one of said first and second exhaust components; and
wherein the ring of non-melted solder material is transformed into melted solder material to provide a soldered joint between said first and said second exhaust components at said annular solder gap, wherein an entirety of said ring of non-melted solder material is subject to simultaneous application of eddy currents from an induction coil to transform said ring of non-melted solder material into said melted solder material which fills said annular solder gap and hardens to form said soldered joint.

27. The exhaust component assembly according to claim 26 including a solder support surface formed on at least one of said first and second exhaust components to hold said ring of non-melted solder material in direct abutment against said at least one of said first and exhaust components.

28. The exhaust component assembly according to claim 27 wherein said solder support surface comprises a bead, shoulder, or bent end portion of said at least one of said first and second exhaust components.

29. The exhaust component assembly according to claim 26 wherein said melted solder material fills said annular solder gap, and wherein said induction coil does not make contact with said ring of non-melted solder material during transformation of said ring of non-melted solder material into said melted solder material.

* * * * *

UNITED STATES PATENT AND TRADEMARK OFFICE
CERTIFICATE OF CORRECTION

PATENT NO. : 10,352,484 B2
APPLICATION NO. : 13/011982
DATED : July 16, 2019
INVENTOR(S) : Alfred Blueml and Hongjiang Cui Page 1 of 1

It is certified that error appears in the above-identified patent and that said Letters Patent is hereby corrected as shown below:

In the Claims

In Claim 21, Column 12, Line 6-7; replace "claim 20" with --claim 19--

Signed and Sealed this
Eighth Day of March, 2022

Drew Hirshfeld
*Performing the Functions and Duties of the
Under Secretary of Commerce for Intellectual Property and
Director of the United States Patent and Trademark Office*